United States Patent [19]

Okada et al.

[11] Patent Number: 4,702,120
[45] Date of Patent: Oct. 27, 1987

[54] KEY-SHIFT TRANSMISSION

[75] Inventors: Hideaki Okada, Takarazuka; Koji Irikura, Nishinomiya, both of Japan

[73] Assignee: Kanzaki Kokyukoki Mfg. Co., Ltd., Amagasaki, Japan

[21] Appl. No.: 940,247

[22] Filed: Dec. 10, 1986

[30] Foreign Application Priority Data

Jan. 10, 1986 [JP] Japan ............................. 61-1720[U]

[51] Int. Cl.⁴ ............................................. F16H 3/08
[52] U.S. Cl. .................................. 74/371; 192/48.91; 192/76
[58] Field of Search ............... 74/371, 372; 192/48.91, 192/76, 71

[56] References Cited

U.S. PATENT DOCUMENTS

| 841,520 | 1/1907 | Herisson | 192/76 |
|---|---|---|---|
| 1,354,956 | 10/1920 | Clarke | 74/371 |
| 2,375,787 | 6/1945 | Hazard et al. | 74/681 |
| 2,395,433 | 2/1945 | Sundt | 74/337.5 |
| 3,028,763 | 4/1962 | Vetsch | 74/371 |
| 3,812,735 | 5/1974 | Kaler et al. | 74/371 |
| 4,662,241 | 5/1987 | Edwards | 74/371 X |

FOREIGN PATENT DOCUMENTS

| 443758 | 7/1912 | France | 192/76 |
|---|---|---|---|
| 60-65453 | 5/1985 | Japan . | |

Primary Examiner—Leslie Braun
Assistant Examiner—Dirk Wright

[57] ABSTRACT

In a transmission comprising a plurality of freely rotatable gears on a change-speed shaft, shift keys slidably disposed within the shaft are supported by a shift collar pivotally but non-slidably by an engagement of the keys with the inner circumference of shift collar. The shift keys are biased to pivot for a selective gear-coupling operation by compression leaf springs disposed between an end face of the shift collar and base end projections of the shift keys.

The springs arranged outside the shaft will not require a particular design of the keys and contribute to prolong the life of shift keys. The support structure for shift keys by the shift collar as well as the arrangement of key-biasing springs will secure a compactness of the transmission.

3 Claims, 10 Drawing Figures

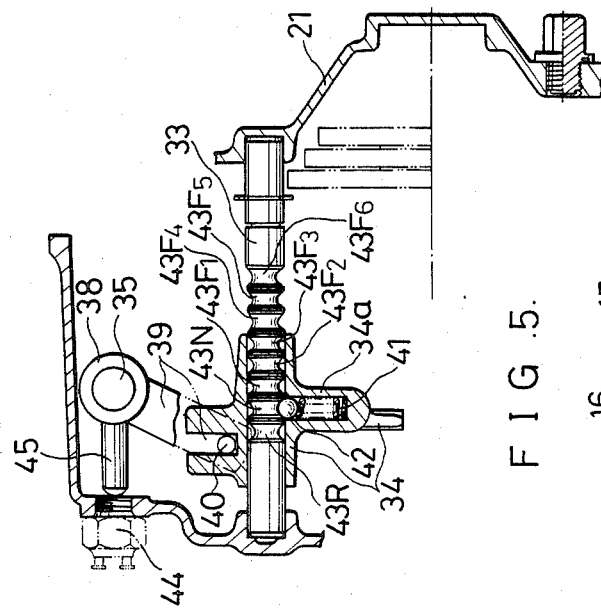
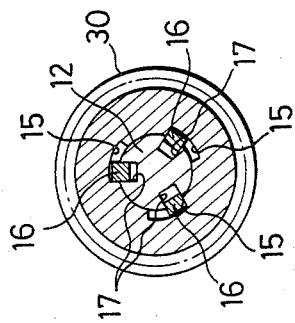
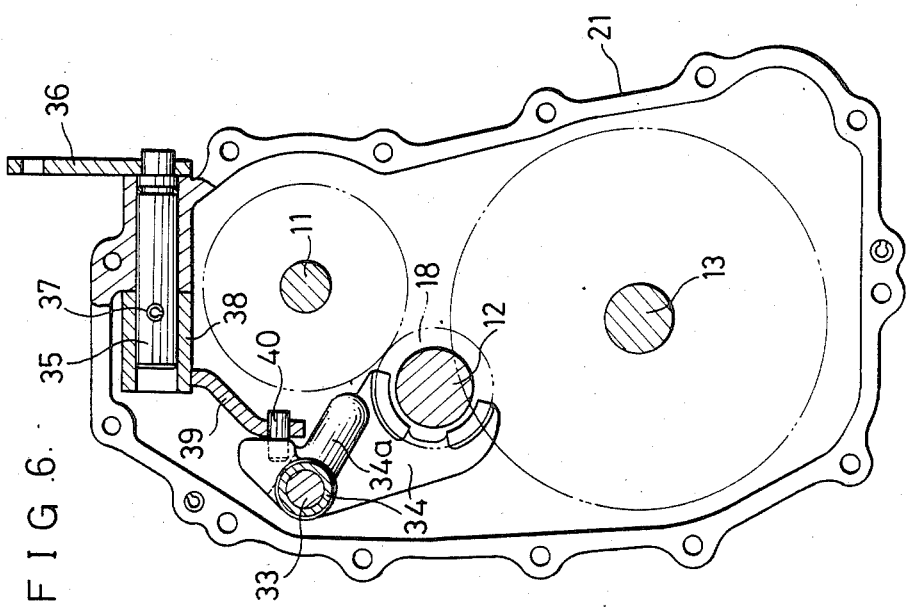

KEY-SHIFT TRANSMISSION

FIELD OF THE INVENTION

This invention relates to a transmission for use in, for example, speed-change purposes of small-sized working vehicles such as mower tractors.

More particularly, the present invention relates to a key-shift transmission in which a plurality of change gears freely rotatable on a transmission shaft are coupled one at a time to such shaft by slidable shift keys each having a gear-engaging lug.

BACKGROUND OF THE INVENTION

In a key-shift transmission, a speed change is achieved by shifting a shift collar on a shaft so as to displace gear-engaging lugs of shift keys to a position where the lugs are projected radially outwardly from elongated grooves in the outer surface of the shaft into recesses of one of freely rotatable change gears so as to couple such one gear to the shaft. For biasing a shift key so as to project a gear-engaging lug thereof outwardly, there have been used two ways. One of the ways employs a self-biasing key made from a resilient material into an appropriated configuration, as shown in, for example, U.S. Pat. No. 3,812,735. The other way employs a separate leaf spring which is affixed to the inner surface of a shift key, as shown in, for example, U.S. Pat. Nos. 2,395,433 and 3,028,763. Of the latter two U.S. patents U.S. Pat. No. 2,395,433 discloses a resiliently deformable shift key to which a leaf spring is associated, whereas U.S. Pat. No. 3,028,768 discloses a shift key having an end portion pivotally connected to a base half of the key and a leaf spring affixed to the rotatable end portion.

The former way employing a self-biasing key has a drawback that repeated uses of such key will cause a considerable fatigue of the key resulting in a lack of biasing force and, therefore, gear-coupling force which in turn will result in an uncertainty of speed change transmission. The latter way employing a separate leaf spring will reduce the durability of a shift key, because the leaf spring is arranged within an elongated axial groove in the outer surface of a transmission shaft at the inside of the shift key in a fashion such that the spring is slidably received at a portion thereof by the bottom surface of the elongated groove and because for permitting such arrangement of the leaf spring at least a portion of the shift key is considerably reduced in thickness in the radial direction of the shaft and is thus reduced in strength.

JP, A(J) (Japanese Utility Model Publication under Art. 13bis of the Japanese Utility Law) No. 60-65453 discloses a key-shift transmission which eliminates the drawbacks set forth above. In this transmission, shift keys are pivotally supported at base end portions thereof by a shift collar within which compression springs acting upon the base ends of the shift keys are accomodated for biasing the keys. The compression springs seperate from the shift keys will not cause a fatique of the keys. Such springs also will not reduce strength of the shift keys, because they are arranged outside elongated axial grooves in a transmission shaft so that no reduction of thickness of the shift keys is required.

However, the structure disclosed in JP, A (U) No. 60-65453 will cause a different problem.

In the key-shift transmission shown in JP, A (U) No. 60-65453, shift keys are formed near their base ends with integral projections which extend radially outwardly of a transmission shaft having keyways or elongated axial grooves. Such projections are received in slits formed to an annular key-supporting portion extending axially from the shift collar and are pivotally connected to the supporting portion through pins for providing a pivotal connection of shift keys to the shift collar. The shift collar further has a plurality of tubular spring-accomodating portions which extend radially outwardly from an axial mid portion between the key-supporting portion and a base end shifter-engaging portion. Compression coil springs for biasing shift keys are accomodated within such tubular accomodating portion so as to act upon the base ends of shift keys through balls. It is thus seen that the shift collar has an enlarged axial length due to the additionally provided key-supporting portion and spring-accomodating portions. The plurality of spring-accomodating portions will enlarge substantially the outer diameter of the shift collar.

The enlarged axial length of the shift collar will enlarge the length of transmission shaft mounting such collar to cause an enlargement of the width of a transmission casing. The enlarged outer diameter of the shift collar which rotates in unison with the transmission shaft will provide limitations to the arrangement of transmission members so that compactness of the transmission is impeded.

Accordingly, a primary object of the present invention is to provide a novel key-shift transmission which secures a compactness of the transmission while eliminating the drawbacks referred to before.

BRIEF DESCRIPTION OF THE DRAWINGS

In the accompanying drawings,

FIG. 5 is a cross-sectional view taken along line V—V of FIG. 1;

FIG. 6 is a sectional side view, partially omitted, of the transmission mechanism shown in FIG. 1;

FIG. 7 is a sectional plane view of a part of the transmission mechanism shown in FIG. 1;

GENERAL DESCRIPTION

Figure 1:
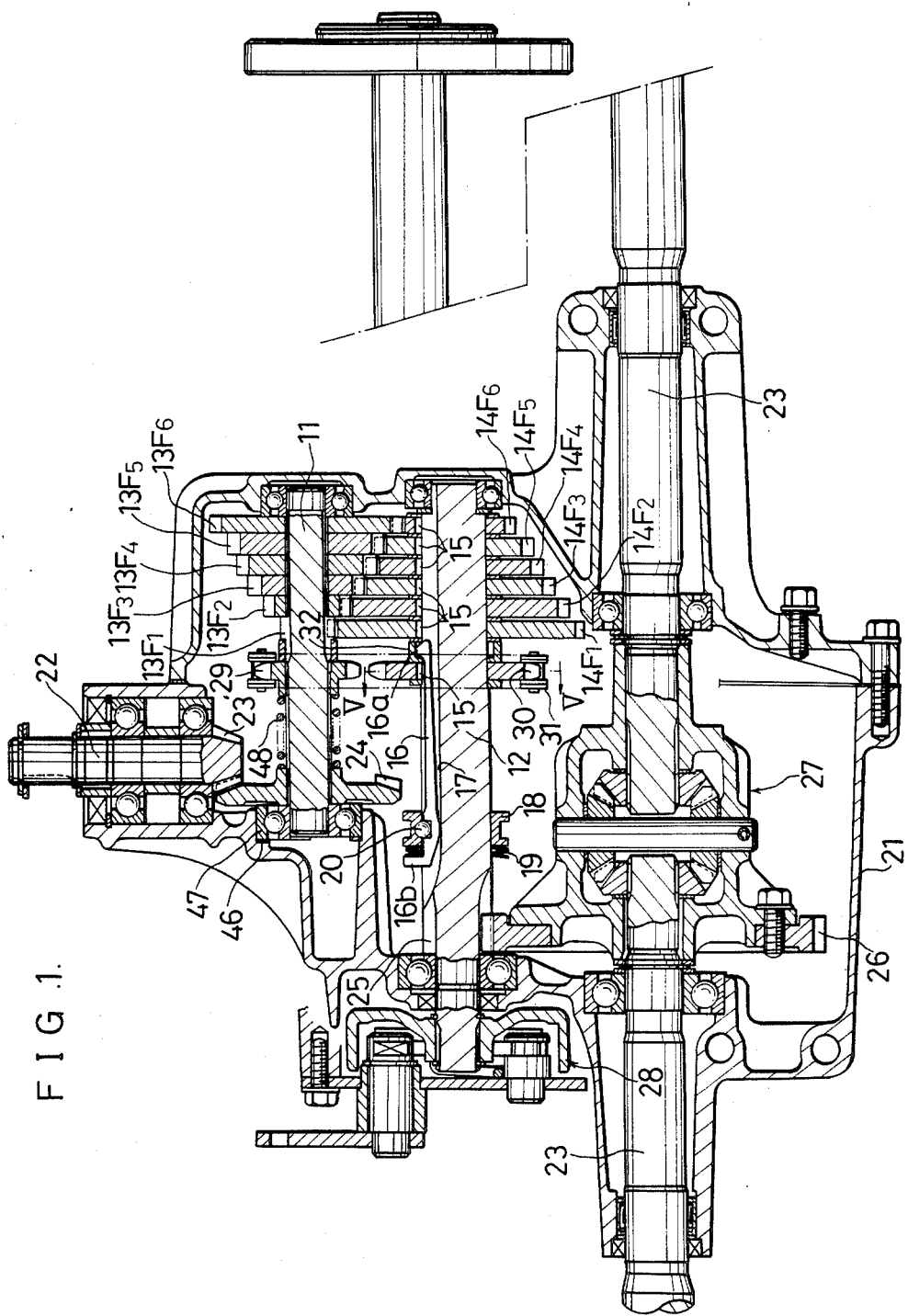
FIG. 1 is a sectional front view, partially developed, of a transmission mechanism in which a first embodiment of the present invention is employed.

As shown in FIG. 1, the key-shift transmission according to the present invention comprises:

a first shaft 11 having thereon co-rotatable first gears $13F_1$, $13F_2$, $13F_3$, $13F_4$, $13F_5$ and $13F_6$;

a second shaft 12 arranged in parallel with the first shaft 11 and having thereon freely rotatable second gears $14F_1$, $14F_2$, $14F_3$, $14F_4$, $14F_5$ and $14F_6$, the second gears $14F_1$–$14F_6$ being meshed with the first gears 13F$_1$–13F$_6$, respectively, so as to provide a plurality of speed-change trains of different gear ratios between the first and second shafts 11 and 12;

shift keys 16 slidably disposed within elongated axial grooves 17 in the outer surface of the second shaft 12, each of the shift keys 16 including a free end having a gear-engaging lug 16a selectively projected outwardly of the groove 17 into a recess 15 in the inner circumference of each of the second gears 14F$_1$–14F$_6$ so as to couple the each second gear to the second shaft 12; and a shift collar 18 slidably mounted on the second shaft 12 for shifting the shift keys 16 axially of the second shaft 12.

Figure 3:
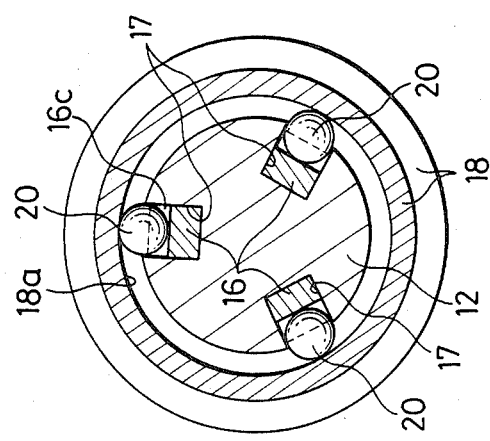
FIG. 3 is a cross-sectional view taken along line III—III of FIG. 2.
Figure 2:
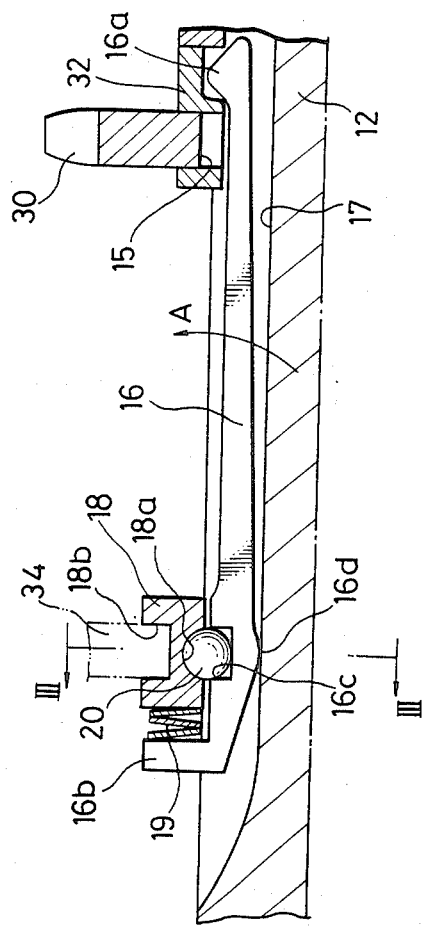
FIG. 2 is an enlarged sectional view of a part of FIG. 1.
Figure 4:
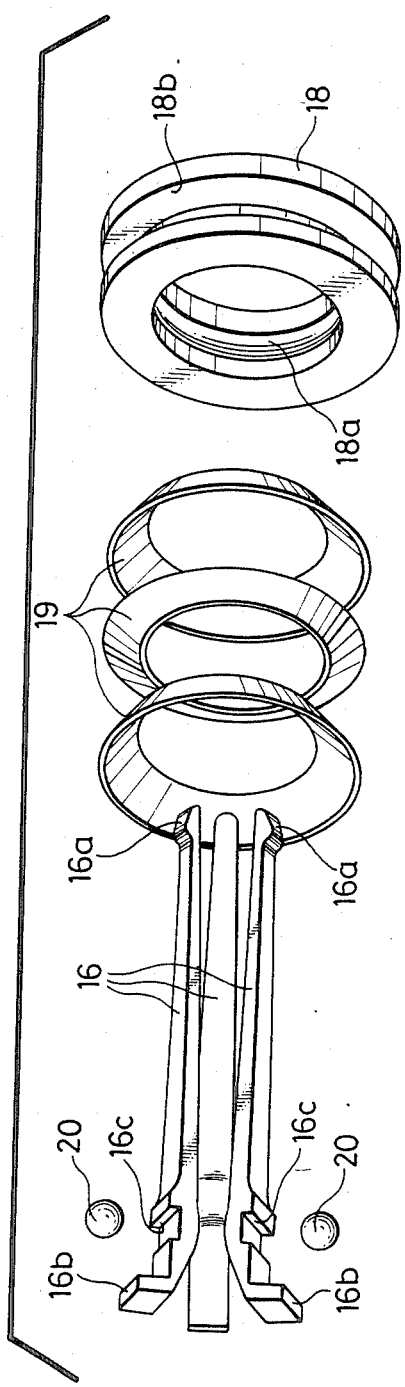
FIG. 4 is a perspective view showing several members employed in the first embodiment.
Figure 8:
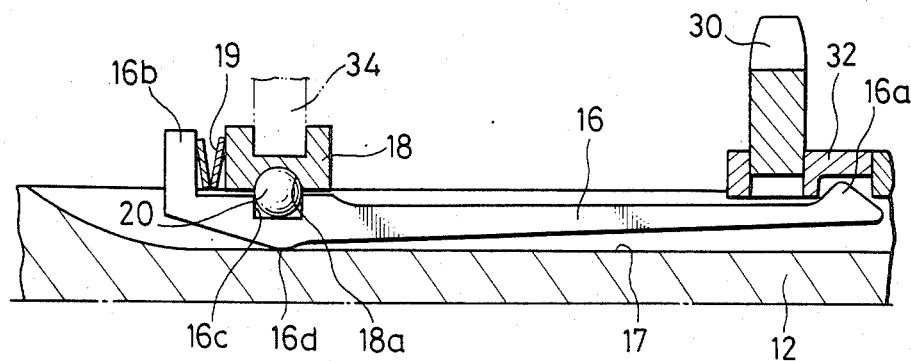
FIG. 8 is a sectional view similar to FIG. 2 but showing a part of a second embodiment of the present invention.
Figure 9:
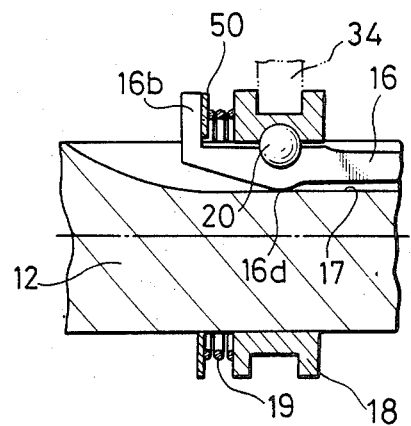
FIG. 9 is a sectional view showing a part of a third embodiment of the present invention.
Figure 10:
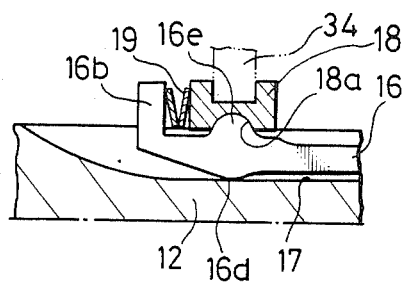
FIG. 10 is a sectional view showing a part of a fourth embodiment of the present invention.

As can be seen from FIGS. 2 to 4 as well as from each of FIGS. 8, 9 and 10, the key-shift transmission according to the present invention further comprises:

engaging means (18a, 20; 18a, 16e) disposed between the inner circumference of the shift collar and base end portions of the shift keys 16 for engaging the shift keys 16 non-slidably with the shift collar 18 while permitting a rotation of each of the shift key 16 along a direction such that the gear-engaging lug 16a thereof is moved radially of the second shaft 12; and compression spring means (19) disposed between axial end surface of the shift collar 18 and projections 16b on base ends of the shift keys 16 for biasing the shift keys 16 so as to project the gear-engaging lugs 16a outwardly of the grooves 17, each of the projections 16b being formed integrally with each of the shift keys 16 and extending radially outwardly of the second shaft 12.

In a preferred embodiment shown in FIGS. 1 to 4, a plurality of leaf springs 19 are provided as the compression spring means set forth above.

In such preferred embodiment, the engaging means set forth above comprises an annular groove 18a, formed to the inner circumference of the shift collar 18, and balls 20 retained by the shift keys 16 and received in the annular groove 18a.

The compression springs or leaf springs 19 always act upon the projections 16b on the base ends of shift keys 16 so as to force such keys 16 to rotate or pivot in a direction of arrow A shown in FIG. 2 so that the gear-engaging lugs 16a are always forced to move outwardly of the elongated grooves 17 in the outer surface of the second shaft 12.

Consequently, when the shift collar 18 has been shifted or displaced along the second shaft 12 to a position such that the key-engaging lugs 16a on the free ends of shift keys 16 are faced to the inner circumference of any one of the gears 14F$_1$–14F$_6$, the lugs 16a will be projected into recesses 15 so as to couple such gear to the second shaft when the gear has been rotated to a phase where the recesses 15 are faced to lugs 16a. Accordingly, multi-stage speed change transmission can be achieved, as required, between the first and second shafts 11 and 12.

A non-slidable connection of the shift keys 16 to the shift collar 18 as well as a pivotal supporting of such shift keys 16 by the shift collar 18 are attained according to the present invention by an engagement of the shift keys 16 with the inner circumference of shift collar 18. Owin to this, axial length of the shift collar 18 is not enlarged so much notwithstanding the provision of compression springs 19 between such collar and the projections 16b on the base ends of shift keys 16. Compression springs 19 are disposed within the outer diameter of the shift collar 18 so that such spring do not enlarge the radial size of shift collar 18.

A compactness of the transmission is thus secured.

The compression springs 19 separately provided for biasing the shift keys 16 will prevent a fatigue of the keys throughout the repeated gear-engaging operations by such keys. The separate compression springs 19 disposed outside the second shaft will not require to reduce the thickness of shift keys 16 in the direction of depth of elongated axial grooves 17 so that a stiffness enough to secure a long life can be given to each of the shift keys 16.

SPECIFIC DESCRIPTION

FIGS. 1 to 7 illustrate a transmission mechanism for a self-propelled working vehicle such as mower tractor in which a first preferred embodiment of the present invention is employed.

In FIG. 1, numeral 21 designates a transmission casing to be mounted on a small-sized working vehicle. Within the casing 21 are rotatably arranged an input shaft 22 having one end extending outwardly of the casing, first and second transmission shafts 11 and 12, referred to before, each of which extends perpendicularly to the input shaft 22 and along a direction across the vehicle, and coaxially disposed left and right wheel axles 23 which extend in parallel with the first and second shafts and outwardly of the casing 21. The input shaft 22 is powered by engine (not shown). Left and right rear wheels (not shown) of the vehicle are attached to the outer ends of the left and right axles 23. Within the transmission casing 21, power is transmitted from the input shaft 22 to the first shaft 11 through a reduction gearing having smaller and larger bevel gears 23' and 24. The second shaft 12 is adapted to be driven to rotate by the first shaft 11 with a drive ratio selected from a plurality of drive ratios. A differential gearing 27 is provided which is powered from the second shaft 12 through meshing gears 25 and 26. Left and right axles 23 are fashioned as left and right output shafts of the differential gearing 27. A brake 28 located outside the transmission casing 21 is associated to the second shaft 12 for selectively braking the vehicle.

A key-shift transmission according to the present invention is arranged between the first and second shafts 11 and 12. This transmission includes six forward direction speed-change trains comprising change gears 13F$_1$–13F$_6$ and 14F$_1$–14F$_6$, referred to before, as well as a backward direction speed-change train for a selective backward travel of the vehicle with a reduced speed. The latter train comprises a sprocket wheel 29 fixedly mounted on the first shaft 11, a sprocket wheel 30 rotatably mounted on the second shaft 12, and a chain 31 entrained over the sprocket wheels 29 and 30. The inner circumference of each of the gears 14F$_1$–14F$_6$ includes therein recesses 15 referred to before. Similar recesses 15 are also formed to the inner circumference of sprocket wheel 30 on the second shaft 12. The forward direction gear trains are arranged so that gear trains for first to sixth speeds are placed successively from the left towards the right, as viewed in FIG. 1. Between the first speed gear 14F$_1$ and sprocket wheel 30 on the second shaft 12 is disposed a spacer collar 32 having an annular groove for resting therein key-engaging lugs 16a of shift keys 16 at a neutral condition of the speed-change transmission.

Embodical structure employed in the illustrated transmission for selectively coupling the change gears $14F_1-14F_6$ as well as sprocket wheel 30 to the second shaft 12 will now be detailed by referring to FIGS. 1 to 5.

Three shift keys 16 are provided, and correspondingly the second shaft 12 is formed at the outer surface thereof with three elongated axial grooves 17 each of which has an open end at the right end face, as viewed in FIG. 1, of the shaft 12. Each of the recesses 15 in the inner circumference of each of the gears $14F_1-14F_6$ and sprocket wheel 30 is formed to have a circular width larger than that of each key 16 for an easy entering of the key-engaging lug 16a, as shown in FIG. 5 with respect to recesses 15 in the sprocket wheel 30.

As clearly shown in FIGS. 2 to 4, each of the shift keys 16 retains a ball 20 by a recess 16c formed to such key near the base end thereof. Annular groove 18a referred to before is formed in the inner circumference of the shift collar 18 at an axial portion of such collar where an annular fork-receiving groove 18b in the outer circumference of shift collar 18 is formed. Such groove 18a has a semi-circular cross-section for fittingly receiving balls 20. Each of the shift keys 16 has at the inside of the recess 16c a projection 16d which is in a slidable engagement with the bottom surface of the elongated groove or keyway 17. Pivot for a rotation of the key 16 is provided by such projection 16d.

FIGS. 6 and 7 illustrate an operating mechanism for the shift collar 18. Within the transmission casing 21 is fixedly provided a fork shaft 33 which is arranged in parallel with the second shaft 12. This fork shaft 33 slidably upports a shifter fork 34 which extends into the fork-receiving groove 18b in the shift collar 18 so as to be engaged with such collar for providing a sliding movement to the collar. A control shaft 35 extending perpendicularly to the fork shaft 33 is rotatably supported by a wall of the casing 21. This control shaft 35 carries at the outside of casing 21 a lever 36 which is operated to move by a change lever not shown in the drawings for providing a rotation to the control shaft. Within the casing 21, a hollow cylindrical member 38 is mounted on the control shaft 35 and is secured to such shaft 35 using a split pin 37. To the cylindrical member 38 is attached an arm 39 carrying a pin 40 which is engaged to the shifter fork 34 so as to provide a sliding movement along the fork shaft 33 to the shifter fork 34 when the arm 39 is rotated together with the control shaft 35 and cylindrical member 38.

Shifter fork 34 is provided integrally with a tubular portion 34a having an open end at the outer circumference of fork shaft 33 in which eight annular latching grooves 43R, 43N, $43F_1$, $43F_2$, $43F_3$, $43F_4$, $43F_5$ and $43F_6$ are formed intermittently along the axial direction of the shaft 33 in that order. Within the tubular portion 34a are disposed latching spring 41 and ball 42 which cooperate with each of the grooves $43R-43F_6$ so as to latch the fork 34 at each of a neutral position and seven operative positions. To a wall of the transmission casing 21 is attached a neutral condition-detecting switch 44 which is actuated by a switch-actuating arm 45, attached to the cylindrical member 38, at the neutral position of the shifter fork 34 where the ball 42 is projected into the latching groove 43N, as shown in FIG. 7.

As shown in FIG. 1, there is disposed a shim 46 between an inner surface of the transmission casing 21 and an end face of a bearing 47, receiving one end portion of the first shaft 11, for positioning the shaft 11 relative to the casing 21. An axial displacement of the shaft 11 could be caused when an axial clearance remains between the shim 46 and bearing 47 due to a possible manufacturing error with respect to the casing. Such displacement of the shaft 11 will harm a smooth mesh between two gears of each of the speed-change gear trains. On the shaft 11 is thus provided a compression coil spring 48 which is disposed between the sprocket wheel 29 and bevel gear 24 so as to force the gear 24 and bearing 24 towards the shim 46 for eliminating the axial clearance referred to above.

Transmission mechanism shown in FIGS. 1 to 7 operates as follows:

When lever 36 shown in FIG. 6 is rotated by a change lever (not shown) so as to slide the shifter fork 34 along the fork shaft 33 so that shift collar 18 on the second shaft 12 is displaced to a position where the gear-engaging lugs 16a of shift keys 16 are faced to the inner circumference of one of the gears $14F_1-14F_6$ or sprocket wheel 30, lugs 16a of the shift keys 16 project under the biasing force of springs 19 into the recesses 15 of such one gear or sprocket wheel so as to couple same firmly to the second shaft 12. Selective drive of the vehicle with a drive ratio selected from six forward drive ratios and one backward drive ratio can thus be achieved. In the neutral condition of the transmission the gear-engaging lugs 16a of shift keys 16 are in the annular groove of the spacer collar 32, as shown in FIG. 1. The latching grooves $43R-43F_6$ in the outer surface of fork shaft 33 are formed in correspondence with the arrangement of sprocket wheel 30, spacer collar 32 and gears $14F_1-14F_6$ so that each of them retains the shifter fork 34 releasably at each of the backward direction position, neutral position and first to fifth forward direction positions in cooperation with the ball 42 and spring 41.

In assembling the transmission shown, shift keys 16 are firstly assembled to the shift collar 18 together with balls 20 and springs 19 and then shift collar 18 is brought onto the second shaft 12 from the right, as viewed in FIG. 1, so as to insert the keys 16 into the elongated grooves 17 in the shaft 12.

FIG. 8 illustrates a second embodiment of the present invention in which the three leaf springs employed in the first embodiment are replaced by two leaf springs 19. Such spring set acts upon the projections 16b of shift keys 16 at the outermost end portions of the projections which portions are axially aligned with the outermost end portions of shift collar at which the spring set abuts upon the collar 18. Consequently, the shift keys 16 are supported in a stable manner.

FIG. 9 illustrates a third embodiment in which a compression coil spring 19 is employed as spring means for biasing shift keys 16. On the shaft 12 is arranged a ring 50 through which the coil spring 19 acts upon a plurality of or three shift keys 16.

FIG. 10 illustrates a fourth embodiment in which each of the shift keys 16 is formed with an integral arc-shaped projection 16e which is received in an annular groove 18a in the inner circumference of shift collar 18. A pivotal but non-slidable engagement of the shift keys 16 with the shift collar 18 may also be achieved in this way.

We claim:

1. A key-shift transmission which comprises: a first shaft having thereon co-rotatable first gears; a second shaft arranged in parallel with said first shaft and having thereon freely rotatable second gears, said second gears being meshed with said first gears, respectively, so as to provide a plurality of speed-change trains of different gear ratios between said first and second shafts; shift keys slidably disposed within elongated axial grooves in the outer surface of said second shaft, each of said shift keys including a free end having a gear-engaging lug selectively projected outwardly of said groove into a recess in the inner circumference of each of said second gears so as to couple said each second gear to said second shaft; and a shift collar slidably mounted on said second shaft for shifting said shift keys axially of said second shaft, the key-shift transmission further comprising:

engaging means disposed between the inner circumference of said shift collar and base end portions of said shift keys for engaging said shift keys non-slidably with said shift collar while permitting a rotation of each of said shift keys along a direction such that said gear-engaging lug thereof is moved radially of said second shaft; and compression spring means disposed between an axial end surface of said shift collar and projections on base ends of said shift keys for biasing said shift keys so as to project said gear-engaging lugs outwardly of said grooves, each of said projections being formed integrally with each of said shift keys and extending radially outwardly of said second shaft.

2. The key-shift transmission according to claim 1, wherein said compression spring means comprises a plurality of leaf springs.

3. The key-shift transmission according to claim 1 or 2, wherein said engaging means comprises: an annular groove formed to the inner circumference of said shift collar; and balls retained by said shift keys and received in said annular groove.

* * * * *